United States Patent
Takahashi et al.

(10) Patent No.: US 11,130,522 B2
(45) Date of Patent: Sep. 28, 2021

(54) LANE DEPARTURE PREVENTION APPARATUS

(71) Applicant: TOYOTA JIDOSHA KABUSHIKI KAISHA, Toyota (JP)

(72) Inventors: Takenoshin Takahashi, Toyota (JP); Masaaki Uechi, Nagoya (JP); Toshinori Esaka, Toyota (JP); Hidenobu Kinugasa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 16/502,697

(22) Filed: Jul. 3, 2019

(65) Prior Publication Data
US 2020/0023899 A1 Jan. 23, 2020

(30) Foreign Application Priority Data

Jul. 17, 2018 (JP) .............................. JP2018-133929

(51) Int. Cl.
*B62D 15/02* (2006.01)
*B60Q 9/00* (2006.01)
*B62D 5/04* (2006.01)

(52) U.S. Cl.
CPC ............. *B62D 15/025* (2013.01); *B60Q 9/00* (2013.01); *B62D 5/0463* (2013.01)

(58) Field of Classification Search
CPC ....... B62D 15/025; B62D 5/0463; B60Q 9/00
See application file for complete search history.

(56) References Cited

U.S. PATENT DOCUMENTS

| 5,765,116 A * | 6/1998 | Wilson-Jones | G05D 1/0246 701/41 |
| 2005/0278098 A1* | 12/2005 | Breed | G01S 13/931 701/45 |
| 2009/0284360 A1* | 11/2009 | Litkouhi | B62D 15/025 340/439 |
| 2009/0299573 A1* | 12/2009 | Thrun | B62D 15/025 701/41 |
| 2010/0191421 A1* | 7/2010 | Nilsson | B62D 6/003 701/41 |

(Continued)

FOREIGN PATENT DOCUMENTS

| CN | 107914712 A | 4/2018 |
| JP | 2013-056636 A | 3/2013 |

OTHER PUBLICATIONS

Office Action dated Jul. 1, 2021 in Chinese Application No. 201910640294.7.

*Primary Examiner* — Behrang Badii
(74) *Attorney, Agent, or Firm* — Sughrue Mion, PLLC

(57) ABSTRACT

A lane departure prevention apparatus includes a driving support ECU configured to perform a lane departure prevention control. The driving support ECU performs the lane departure prevention control with vibrating a steering wheel when determining that a control performing condition becomes satisfied and a traveling lane is straight. The control performing condition becomes satisfied when a vehicle has a high probability of departing from the traveling lane. The driving support ECU performs the lane departure control without vibrating the steering wheel at least in a case where the vehicle has a high probability of departing from the traveling lane toward an outer side of the curved lane.

7 Claims, 10 Drawing Sheets

(56) References Cited

U.S. PATENT DOCUMENTS

| | | | |
|---|---|---|---|
| 2013/0231830 A1* | 9/2013 | Van Dan Elzen | B60W 10/04 701/42 |
| 2016/0001781 A1* | 1/2016 | Fung | B60K 28/02 701/36 |
| 2018/0015919 A1* | 1/2018 | Hanzawa | B60W 30/12 |

* cited by examiner $Ds' = Dsref - Ds$

LANE DEPARTURE PREVENTION APPARATUS

BACKGROUND OF THE INVENTION

1. Field of the Invention

The present invention relates to a lane departure prevention apparatus configured to control a steering assist force in such a manner that a vehicle does not deviate/depart from a lane in which the vehicle is traveling.

2. Description of the Related Art

When a vehicle is likely to deviate from "a lane (a traveling lane) in which the vehicle is traveling", a conventional lane departure prevention apparatus applies a steering assist torque to a steering mechanism to thereby change a steering angle in such a manner that the vehicle is prevented from deviating from the traveling lane. Such a control is referred to as a "lane departure prevention control". The steering assist torque applied to the steering mechanism by the lane departure prevention control is also referred to as a "steering assist torque force" or a "departure prevention torque".

An example (hereinafter, referred to as a "disclosed known apparatus") of such an apparatus, disclosed in Japanese Patent Application Laid-Open No. 2013-56636, superimposes a periodic vibration torque on the "departure prevention torque".

Since a steering wheel is vibrated by this periodic vibration torque, a driver can more certainly recognize that "a specific state is occurring where the vehicle is likely to deviate from the traveling lane".

Meanwhile, a magnitude of the departure prevention torque changes in accordance with a curvature of the traveling lane, a distance (a side distance) between one of the white lines defining the traveling lane and the vehicle, an angle (a yaw angle) formed between a direction of the traveling lane and a travel/moving direction of the vehicle, or the like. For example, the magnitude of the departure prevention torque generated when the vehicle deviates (or is about to deviate) from a curved traveling lane toward an outer side of the traveling lane is greater than the magnitude of the departure prevention torque generated when the vehicle deviates (or is about to deviate) from a straight traveling lane, even if the side distances in those two cases are the same as each other and the yaw angles in those two cases are the same as each other. This is because a steering torque is required to correspond to the curvature of the traveling lane as the departure prevention torque in order to prevent the vehicle from deviating from the traveling lane. On the other hand, while the lane departure prevention control is being performed, the torque corresponding to the departure prevention torque is transmitted to the driver via the steering wheel. Therefore, when the departure prevention torque whose magnitude is relatively great is applied to the steering mechanism, the driver can recognize that the above-described specific state is occurring.

However, even when the magnitude of the departure prevention torque is relatively great (in other words, even when the driver can recognize that the above-described specific state is occurring only through the departure prevention torque), the disclosed known apparatus vibrates the steering wheel. For this reason, the driver may feel annoyed with the vibration of the steering wheel.

SUMMARY OF THE INVENTION

The present invention has been made in order to solve the above-described problem. That is, an object of the present invention is to provide a lane departure prevention apparatus capable of causing a driver to recognize that the above-described specific state is occurring while preventing unnecessary vibration of a steering wheel so as to reduce frequency of causing the driver to feel annoyed, during performing the lane departure prevention control.

The lane departure prevention apparatus of the present invention (hereinafter, referred to as the "present invention apparatus") comprises a lane marker recognition section (11) for recognizing lane markers (LL, LR) on a road on which a vehicle (SV) is traveling;

an electric motor (22) capable of changing a turning angle of the vehicle by applying a steering assist force/torque to a steering mechanism (SW, US) including a steering wheel (SW) of the vehicle; and a control unit (10, 20, 21), when determining that a control performing condition is satisfied, the control performing condition being satisfied when the vehicle has a high probability of departing/deviating from a traveling lane defined by the recognized lane markers:

for determining a target steering assist torque (TLDA) for changing the turning angle in such a manner the vehicle does not depart/deviate from the traveling lane; and for performing a lane departure prevention control to drive the electric motor in such a manner that torque corresponding to the determined target steering assist torque is applied to the steering mechanism.

Further, the control unit is configured:

to determine whether the traveling lane is straight or curved (refer to step 630);

to perform the lane departure prevention control with vibrating the steering wheel when it determines that the control performing condition is satisfied (refer to a "Yes" determination at step 620, refer to a "No" determination at step 665) and the traveling lane is straight (refer to a "No" determination at step 630); and to perform the lane departure prevention control without vibrating the steering wheel (refer to step 660) when it determines that said control performing condition is satisfied (refer to a "Yes" determination at step 620 and a "No" determination at step 665) and said traveling lane is curved (refer to a "Yes" determination at step 630) and at least in a case where said vehicle has a high probability of departing from said traveling lane toward an outer side of said traveling lane (refer to a "Yes" determination at step 640).

When the vehicle is about to depart/deviate (or has a high probability of deviating) from the traveling lane in a period (a straight road traveling period) in which the vehicle is traveling in the straight lane (which includes a lane which can be regarded as a substantially straight lane having a curvature smaller than a predetermined value), the torque/force which is corresponding to the target steering assist torque/force and which is applied to the steering mechanism owing to the lane departure prevention control tends to be relatively small. This is because it is not necessary for the departure prevention torque to include the "steering torque corresponding to the curvature of the traveling lane". Therefore, in a period in which the vehicle is traveling in the straight lane/road, there is a high possibility that it is not possible to reliably notify the driver of the "occurrence of the state (the above-described specific state) where the vehicle is about to depart/deviate from the traveling lane" only with the departure prevention torque.

In contrast, when the vehicle is about to depart/deviate from the traveling lane toward the outer (periphery) side of the curved lane/road (which includes a lane which can be regarded as a substantially curved lane having a curvature greater than the predetermined value) in a period (a curved lane/road traveling period) in which the vehicle is traveling in the curved lane/road, the departure prevention torque tends to be relatively great. This is because it is necessary for the departure prevention torque to include the "steering torque corresponding to the curvature of the traveling lane". Therefore, when the vehicle is about to depart/deviate from the curved traveling lane toward the outer side of the lane in the curved road traveling period, the relatively great departure prevention torque is applied to the steering mechanism. Thus, there is a high probability that the driver can recognize the "occurrence of the state (the above-described specific state) where the vehicle is about to depart/deviate from the traveling lane" only with the departure prevention torque.

In view of the above, when performing the lane departure prevention control in the straight lane/road traveling period, the control unit vibrates the steering wheel and performs the lane departure prevention control. Furthermore, when at least in a case where the vehicle has a high probability of departing/deviating from the curved lane/road towards the outer side of the lane/road, the control unit performs the lane departure prevention control without vibrating the steering wheel.

As a result, the present invention apparatus can reduce frequency of occurrence of a state in which the steering wheel is unnecessarily vibrated and can notify the driver of the occurrence of the above-described specific state (that is, the intervention in the steering control by the lane departure prevention control). Therefore, the present invention apparatus can reduce the "vibration of the steering which causes the driver to feel annoyed.

In one of aspects of the present invention apparatus, the control unit is configured to perform the lane departure prevention control with vibrating the steering wheel (refer to step 635 of FIG. 6) when it determines that the control performing condition is satisfied (refer to a "Yes" determination at step 620) and the traveling lane is curved (refer to a "Yes" determination at step 630) and in a case where the vehicle has a high probability of departing/ deviating from the traveling lane toward an inner side of the lane (refer to a "No" determination at step 635 of FIG. 6).

When the vehicle is about to depart/deviate from the curved traveling lane toward the inner (periphery) side of the lane in the curved lane/road traveling period, the magnitude of the departure prevention torque is often relatively small, as will be detailed below.

In view of the above, when the vehicle is about to depart/deviate from the curved traveling lane toward the inner (periphery) side of the lane in the curved lane/road traveling period, the control unit performs the lane departure prevention control with vibrating the steering wheel. Therefore, even if the driver is hard to notice the intervention in the steering control to prevent the lane departure, the above-mentioned aspect can notify the driver of "the occurrence of the situation where the vehicle is about to depart/deviate from the traveling lane" owing to the vibration of the steering wheel.

In one of aspects of the present invention apparatus, the control unit is configured, when it determines that the control performing condition is satisfied and the traveling lane is curved (refer to a "Yes" determination at step 630 of FIG. 9), to perform the lane departure prevention control without vibrating the steering wheel (refer to step 660 of FIG. 9), regardless of whether the vehicle is about to depart/deviate from the traveling lane toward an inner side or the outer side of the lane.

According to the above-mentioned aspect, when the lane departure prevention control is performed in the curved road traveling period, the lane departure prevention control is performed without vibrating the steering wheel, regardless of whether the vehicle is about to depart/deviate from the traveling lane toward the inner periphery side or the outer periphery side of the curved lane/road. Therefore, the vibration of the steering wheel SW with low necessity is not performed in the curved road traveling period. As a result, the above-mentioned aspect can reduce the frequency of causing the driver to feel annoyed.

In one of aspects of the present invention apparatus, the control unit is configured:

to perform the lane departure prevention control with vibrating the steering wheel for a predetermined time (refer to a "No" determination at step 820 of FIG. 8, step 635 of FIG. 8) when it determines that the control performing condition is satisfied and the traveling lane is curved (refer to a "Yes" determination at step 635 of FIG. 8) and at least in the case where the vehicle has a high probability of departing/deviating from the traveling lane toward the outer side of the traveling lane (refer to a "Yes" determination at step 635 of FIG. 8); and to thereafter perform the lane departure prevention control without vibrating the steering wheel (refer to a "Yes" determination at step 820 of FIG. 8, step 660 of FIG. 8).

As will be described later, in a period (a "specific initial period") immediately after a time point at which the vehicle has a high probability of departing from the curved traveling lane toward the outer (periphery) side of the lane, the magnitude of the departure prevention torque is often not large enough to enable the driver to reliably notice that a situation occurs where the vehicle is about to depart/deviate from the lane. In view of the above, when the vehicle is about to depart/deviate from the curved traveling lane toward the outer side of the lane, the control unit performs the lane departure prevention control and vibrates the steering wheel for the predetermined time. Therefore, the above-mentioned aspect can vibrate the steering wheel in the specific initial period, to thereby be able to more surely notify the driver that the vehicle is about to depart/deviate from the traveling lane.

One of aspects of the present invention apparatus further comprises a vibration actuator (33), which is installed in the steering wheel and configured to vibrate the steering wheel, wherein, the control unit is configured to vibrate the steering wheel using the vibration actuator.

According to the above-mentioned aspect, the vibration of the steering wheel during the lane departure prevention control can be easily provided with the vibration actuator in the steering wheel.

In one of aspects of the present invention apparatus, the control unit is configured to vibrate the steering wheel using the electric motor.

According to the above-mentioned aspect, it is possible to vibrate the steering wheel without additionally providing a member such as the vibration actuator to the steering wheel.

In one of aspects of the present invention apparatus, the control unit is configured to determine the steering assist force (refer to step 627) as force which includes:

a feedforward amount, which is necessary for causing the vehicle to travel along the traveling lane and is determined based on a value corresponding to a curvature of the traveling lane; and a feedback amount, which is determined based on a distance in a lane width direction between a reference point on the vehicle and one of the lane markers.

According to the above-mentioned aspect, the target steering assist torque/force is determined in accordance with the curvature of the traveling lane and the distance in the lane width direction between the vehicle and one of the lane markers. Therefore, the lane departure prevention control can apply "a torque/force capable of preventing the vehicle from departing/deviating from the traveling lane and of causing the vehicle to travel along the traveling lane" to the steering mechanism. As a result, a load imposed on the driver for steering can be effectively reduced.

In the above description, references used in the following descriptions regarding embodiments are added with parentheses to the elements of the present invention, in order to assist in understanding the present invention. However, those references should not be used to limit the scope of the invention.

DETAILED DESCRIPTION OF THE EMBODIMENT

Figure 1:
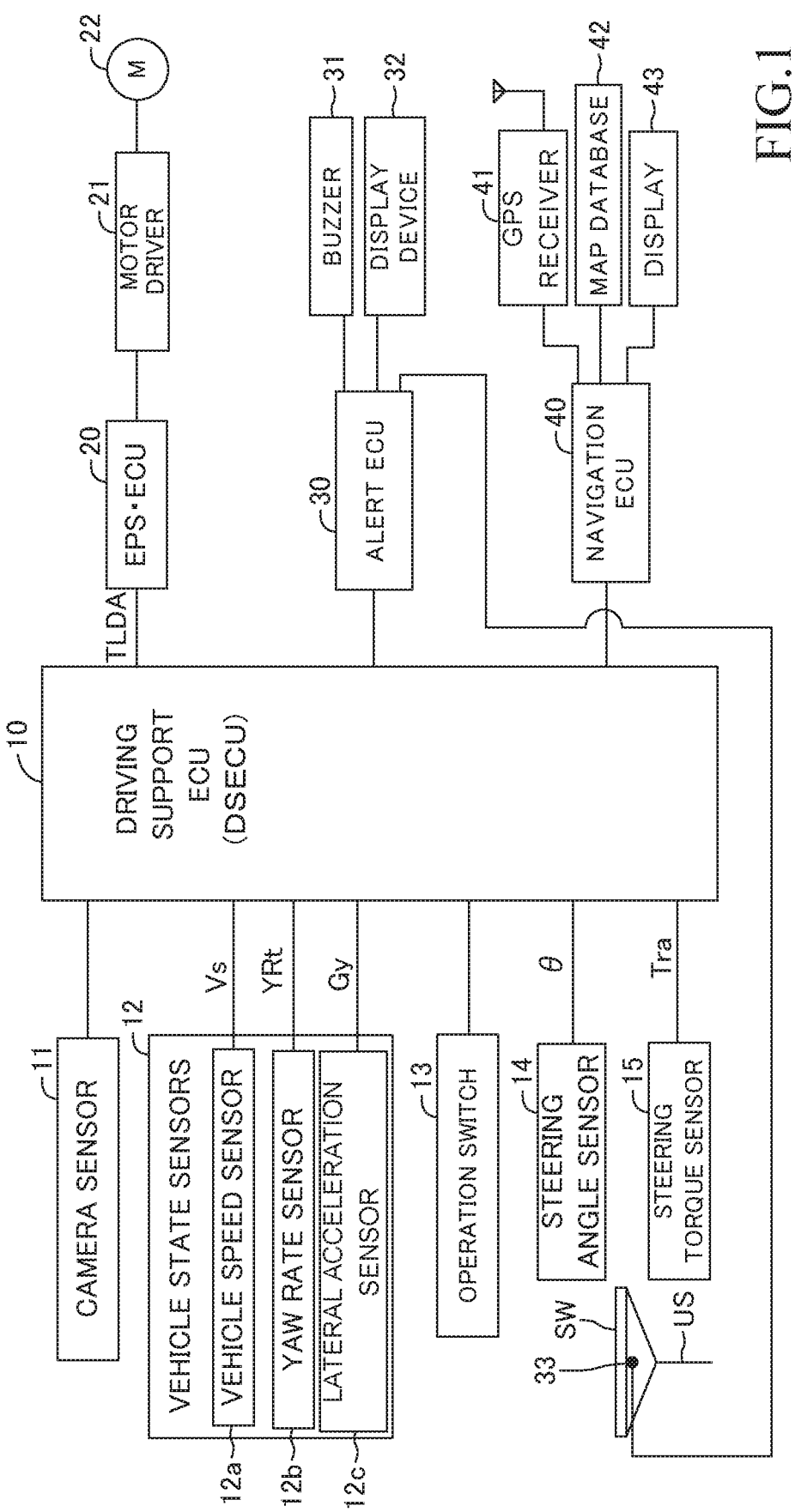
FIG. 1 is a schematic configuration diagram for illustrating a lane departure prevention apparatus (a first embodiment apparatus) according to a first embodiment of the present invention.

A lane departure prevention apparatus according to each of embodiments of the present invention will be described below, referring to drawings. It should be noted that, throughout all of the drawings, the same reference numerals are assigned to the same or corresponding parts.

First Embodiment

<Construction>

The lane departure prevention apparatus according to the first embodiment of the present invention (hereinafter, referred to as a "first embodiment apparatus" in some cases) is applied to a vehicle (not shown).

As shown in FIG. 1, the first embodiment apparatus comprises a driving support ECU 10, an electric power steering ECU 20, an alert ECU 30, and a navigation ECU 40. Hereinafter, the electric power steering ECU 20 is referred to as an "EPS·ECU 20". It should be noted that, hereinafter, the driving support ECU 10 is simply referred to as a "DSECU".

Each of those ECUs is an electric control unit comprising a microcomputer as a main part. The ECUs are connected with each other via a CAN (Controller Area Network) which is not illustrated so that they are capable of mutually transmitting and receiving information.

In the present specification, the microcomputer includes a CPU, a ROM, a RAM, a non-volatile memory, an interface I/F, and the like. The CPU is configured to realize various functions by executing instructions (programs, routines) stored in the ROM. Some or all of these ECUs may be integrated into a single ECU.

The first embodiment apparatus includes a camera sensor 11, vehicle state sensors 12, an operation switch 13, a steering angle sensor 14, and a steering torque sensor 15. The vehicle SV is equipped with them (refer to FIG. 2). The DSECU is electrically connected to these sensors and the switch. The DSECU is configured to receive detection signals or output signals of these sensors and the switch. It should be noted that these sensors and the switch may be electrically connected to the ECU other than the DSECU. In this case, the DSECU receives the detection signals or the output signals of the sensors from the ECU electrically connected to the sensors or the switch via the CAN.

The camera sensor 11 includes "a stereo camera and an image processing part" (not shown). The stereo camera photographs (takes an image of) views/landscapes of the "left side area and the right side area" in front (ahead) of the vehicle SV to acquire/obtain a left-front image data and a right-front image data.

Figure 2A:
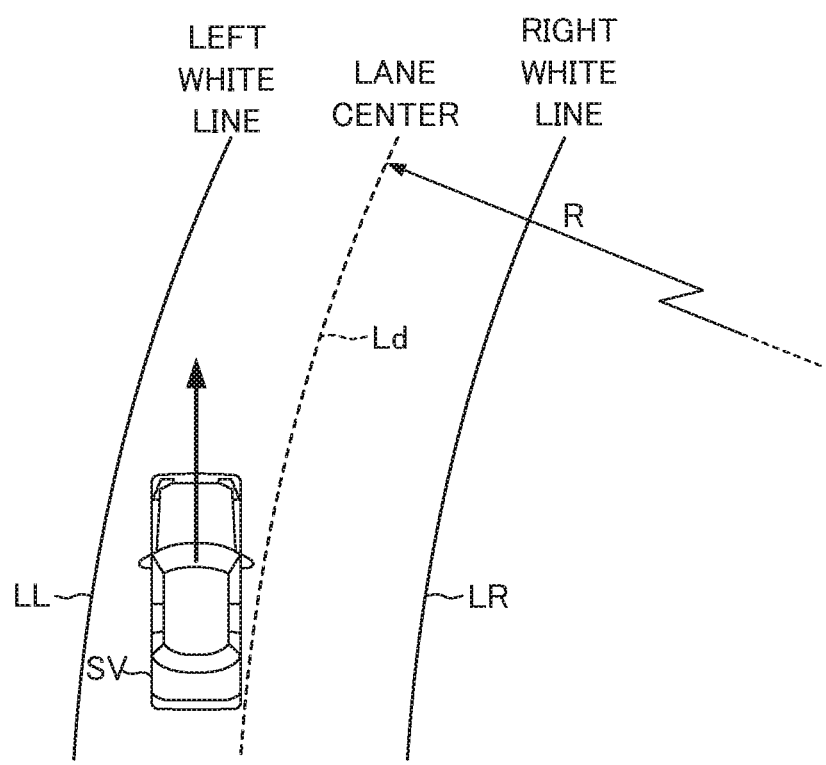
FIG. 2A is a plan view showing left and right white lines LL and LR, a lane center line Ld, and a curve radius R.
Figure 2B:
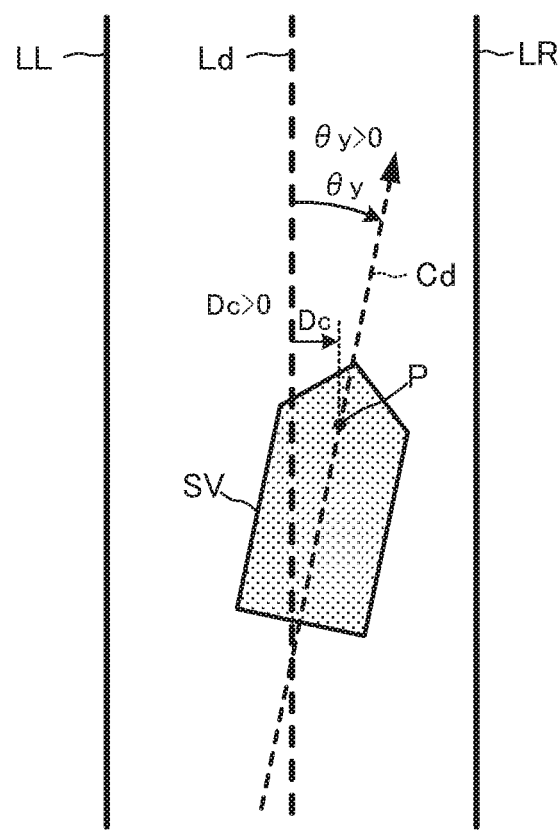
FIG. 2B is a plan view showing a positional relationship between a traveling lane and a vehicle.

As shown in FIG. 2A and FIG. 2B, the image processing part of the camera sensor 11 recognizes (detects) lane dividing lines (lane markers or division lines) based on the left-front image data and the right-front image data. Since typical examples of the lane dividing lines are "a left white line LL and a right white line LR" on a road, hereinafter, the lane dividing lines are also simply referred to as "white lines".

The image processing part calculates "a shape (a curve radius R or a curvature Cv) of a lane (that is, a traveling lane) in which the vehicle SV is traveling", and a positional relationship between the traveling lane and the vehicle SV, every time a predetermined time elapses. Then, the image processing part transmits calculated results to the DSECU, every time the predetermined time elapses.

"The positional relationship between the traveling lane and the vehicle SV" calculated/obtained by the image processing part is represented by the following parameters (refer to FIG. 2B), for example.

A distance Dc: the distance Dc is a distance in a lane width direction between "a line (a lane center line Ld) connecting the center positions (points) which are positioned at the center in the lane width direction of the traveling lane" and "the reference point P on the vehicle SV".

It should be noted that in this example, the reference point P on the vehicle SV is the center position between the left and right front wheels on the axle of the left and right front wheels of the vehicle SV.

An angle (that is, a yaw angle $\theta y$): the yaw angle $\theta y$ is an angle formed between a direction of the lane center line Ld and a center axis in a longitudinal direction of the vehicle SV (that is, the center axis is a direction Cd in which the vehicle SV heads).

Referring to FIG. 1 again, the vehicle state sensors 12 include various sensors such as a vehicle speed sensor 12a, a yaw rate sensor 12b, a lateral acceleration sensor 12c, and the like.

The vehicle speed sensor 12a is configured to detect a traveling speed (a vehicle speed) of the vehicle SV to output a signal indicative of the detected vehicle speed Vs (the vehicle speed). The vehicle speed Vs is a speed (a longitudinal speed) in the longitudinal direction of the vehicle SV.

A yaw rate sensor 12b is configured to detect a yaw rate of the vehicle SV to output a signal indicative of the detected yaw rate YRt (an actual yaw rate YRt). It should be noted that the actual yaw rate YRt is a positive value when the vehicle SV is turning left while traveling forward and is a negative value when the vehicle SV is turning right while traveling forward.

The lateral acceleration sensor 12c is configured to detect an acceleration in a vehicle width direction of the vehicle SV to output the detected lateral acceleration Gy. It should be noted that the lateral acceleration Gy is a positive value (that is, a positive value with respect to the acceleration in the right direction of the vehicle SV) when the vehicle SV is turning left while traveling forward and is a negative value (that is, a negative value with respect to the acceleration in the left direction of the vehicle SV) when the vehicle SV is turning right while traveling forward.

The operation switch 13 is a switch for selecting whether or not a driver of the vehicle SV allows performing the lane departure prevention control. The lane departure prevention control is a "steering control of the vehicle SV" to apply a steering assist torque (this torque is a steering assist force and is also referred to as a "departure prevention torque") to a steering mechanism in such a manner that a position of the vehicle SV does not deviate from the traveling lane toward the outside of the traveling lane, so as to change a steering angle. That is, the lane departure prevention control is control to support a steering operation of the driver in such a manner that the vehicle SV does not deviate from the traveling lane toward the outside of the traveling lane.

The DSECU recognizes that a state of the operation switch 13 is in an ON state when the operation switch 13 is at the ON position, and recognizes that the state of the operation switch 13 is in an OFF state when the operation switch 13 is at the OFF position.

The steering angle sensor 14 is configured to detect the steering angle of the vehicle SV to output a signal indicative of the detected steering angle $\theta$. The steering torque sensor 15 is provided on a steering shaft US. The steering torque sensor 15 is configured to detect a steering torque applied to the steering shaft US by the operation of a steering wheel SW (a steering handle SW) to output a signal indicative of the detected steering torque Tra.

The EPS·ECU 20 is a control unit of a well-known electric power steering system. The EPS·ECU 20 is connected to a motor driver 21.

The motor driver 21 is connected to a steering motor 22. The steering motor 22 is incorporated into the "steering mechanism including the steering wheel SW, the steering shaft US, a gear mechanism for steering (not shown), and the like". The steering motor 22 is an electric motor (an electric actuator). The steering motor 22 generates a torque (force) by an electric power supplied from the motor driver 21. This torque is used as the steering assist torque (the steering assist force). The steering motor 22 can steer the left and right steering wheels by this torque. That is, the steering motor 22 can change the steering angle (also referred to as a "turning angle") of the vehicle SV.

The EPS·ECU 20 acquires/obtains the steering torque Tra which the torque sensor 15 detects as a steering torque (hereinafter, also referred to as a "driver torque TqDr") applied to the steering wheel SW by the driver, when the lane departure prevention control is not being performed.

Furthermore, the EPS·ECU 20 drives the steering motor 22 based on its driver torque TqDr to apply the steering assist torque to the steering mechanism, thereby assisting the driver to operate the steering wheel SW.

Furthermore, when the EPS·ECU 20 receives a steering command transmitted from the DSECU while the lane departure prevention control is being performed, the EPS·ECU 20 drives the steering motor 22 through the motor driver 21 based on the target torque specified in accordance with the steering command, thereby generating the steering assist torque equal to the target torque. This steering assist torque is different from the steering assist torque for assisting (lightening) the operation of the steering wheel SW by the driver. This steering assist torque is a torque applied to the steering mechanism based on the steering command transmitted from the DSECU.

The alert ECU 30 is connected to a buzzer 31, a display device 32, and a vibration actuator 33. The alert ECU 30 can have the buzzer 31 generate sounds to alert the driver in response to an instruction transmitted from the DSECU. In addition, the alert ECU 30 can cause the display device 32 to light an attention/alert mark such as a warning lamp and/or to display an attention/alert image, an attention/alert message, and an operation state of the lane departure prevention control.

It should be noted that the display device 32 is a display device for displaying an image in response to an instruction transmitted from the DSECU. Specifically, the display device 32 is a head-up display. The display device 32 may be another type of display such as a multifunction display.

The vibration actuator 33 is provided in the steering wheel SW and is a well-known actuator (for example, the well-known actuator is a vibration actuator provided in a mobile phone) having a function of giving/applying the vibration to the steering wheel SW. The alert ECU 30 transmits a command to the vibration actuator 33 in response to the instruction transmitted from the DSECU to cause the vibration actuator 33 to vibrate the steering wheel SW, to thereby be able to alert the driver.

The navigation ECU 40 is connected to a GPS receiver 41 which receives a GPS detection signal for detecting a present position of the vehicle SV, a map database 42 which stores a map information and the like, a touch-screen type display 43 which is a human-machine interface, and the like.

The navigation ECU 40 identifies/specifies the present position of the vehicle SV based on the GPS detection signal. If the vehicle SV is traveling on the road with multiple lanes, the present position includes information specifying which lane of the road the vehicle SV is traveling. The navigation ECU 40 executes various calculations based on "the present position of the vehicle SV" and "the map information and the like stored in the map database 42", and performs a route guidance using the touch-screen type display 43.

The map information stored in the map database 42 includes road information. The road information includes the curve radius R of the road, the curvature Cv of the road, and/or the like. The curve radius R of the road and/or the curvature Cv indicates a bending degree of the road. Therefore, the navigation ECU 40 can acquire/obtain the curve radius R or the curvature Cv of the lane in which the vehicle SV is traveling, based on the present position of the vehicle SV and the road information at the present time point.

<<Lane Departure Prevention Control>>

An outline of the lane departure prevention control which the DSECU performs will be described below. When performing the lane departure prevention control, the DSECU calculates a target torque for preventing the vehicle SV from deviating the lane, every time a predetermined time elapses. Hereinafter, the target torque is referred to as an "LDA target torque TLDA" or a "target steering assist torque force".

More specifically, when the camera sensor 11 has successfully been recognizing the left white line LL and the right white line LR, the DSECU calculates a curvature Cv (=1/a curve radius R) of the lane center line Ld passing thorough midpoints between the recognized left white line LL and the recognized right white line LR.

Figure 3A:
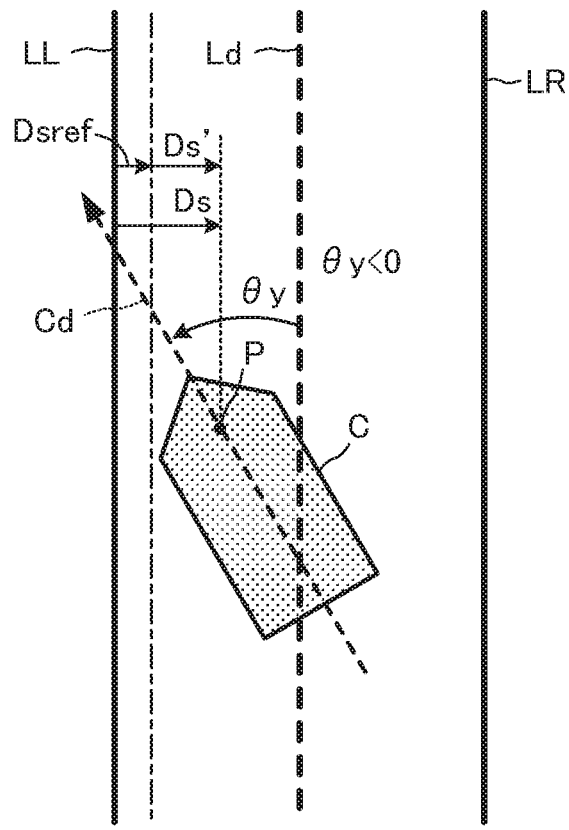
FIG. 3A is a plan view showing lane information (a side distance Ds and a yaw angle θy) used in a lane departure prevention control.

In addition, the DSECU calculates "a position of the vehicle SV within the traveling lane defined by the left white line LL and the right white line LR" and "a direction (a travel direction) of the vehicle SV". More specifically, the DSECU calculates "a side distance Ds and the yaw angle θy" as defined below and shown in FIG. 3A.

The side distance Ds: the side distance Ds is a distance in the lane width direction between "the reference point P on the vehicle SV" and one of the lane markers (one of the white lines). More specifically, the side distance Ds is a distance in a road width direction (the lane width direction) between "an objective white line" and "the reference point P of the vehicle SV". The objective white line is either one of the right white line LR and the left white line LL the white line, whichever is closer to the reference point P of the vehicle SV. In an example shown in FIG. 3A, the objective white line is the left white line LL (because the left white line LL is closer to the reference point P of the vehicle SV than the right white line LR). The side distance Ds is "0" when the reference point P is on the objective white line. The side distance Ds is positive when the reference point P is inside the traveling lane with respect to the objective white line (i.e., at a position in the center side of the road/traveling lane). The side distance Ds is negative when the reference point P is outside the traveling lane with respect to the objective white line (i.e., at a position in the side departing from (or outside of) the road/traveling lane).

The yaw angle θy: the yaw angle θy is an angle (a deviation angle) formed between the direction of the lane center line Ld and the direction Cd in which the vehicle SV heads and is an acute angle from −90° to +90°. The yaw angle θy is "0" when the direction Cd coincides with (or is the same as) the direction of the lane center line Ld. The yaw angle θy is negative when the direction Cd of the vehicle SV inclines in the clockwise direction with respect to the direction of the lane center line Ld. The yaw angle θy is positive when the direction Cd of the vehicle SV inclines in the counterclockwise direction with respect to the direction of the lane center line Ld.

It should be noted that information indicative of values (Ds, θy, Cv) which the DSECU has calculated are referred to as "lane information", for convenience. The DSECU calculates the LDA target torque TLDA based on the lane information (Ds, θy, Cv).

The LDA target torque TLDA is defined so as to become/be positive when the LDA target torque TLDA is a torque to generate the yaw rate of the vehicle SV which is generated when the vehicle SV turns leftward while traveling forward. The LDA target torque TLDA is defined so as to become/be negative when the LDA target torque TLDA is a torque to generate the yaw rate of the vehicle SV which is generated when the vehicle SV turns rightward while traveling forward.

When and after an LDA calculation start condition described below becomes satisfied, the DSECU calculates the LDA target torque TLDA in accordance with the following Expression (1) until an LDA calculation termination condition becomes satisfied, every time a predetermined time elapses. It should be noted that the LDA calculation start condition is a start condition of (or to start) the lane departure prevention control and is also referred to as an "LDA start condition". The LDA calculation termination condition is a termination condition of (or to end/terminate) the lane departure prevention control and is also referred to as an "LDA termination condition". An LDA performing condition (a control performing condition) is continuously satisfied in a period from a time point at which the LDA start condition becomes satisfied to a time point at which the LDA termination condition becomes satisfied.

The LDA calculation start condition: the LDA calculation start condition is a condition to be satisfied when (i) the side distance Ds becomes equal to or shorter/smaller than a reference side distance Dsref and (ii) performing the lane departure control is permitted in accordance with a state of the operation switch 13 (when the state of the operation switch 13 is in the ON state). The reference side distance Dsref is a predetermined value (a positive value) which is greater than "0" and smaller/shorter than a typical traveling lane width.

The LDA calculation termination condition: the LDA calculation termination condition is a condition to be satisfied when both of the following conditions (a) and (b) are satisfied. In addition, when the following condition (c) becomes satisfied, the LDA calculation termination condition becomes satisfied regardless of whether or not at least any one of the conditions (a) and (b) is satisfied.

The condition (a) is a condition to be satisfied when the side distance Ds is greater/longer than the reference side distance Dsref.

The condition (b) is a condition to be satisfied when any one of the following conditions (b1) and (b2) is satisfied.

The condition (b1) is a condition to be satisfied when the objective white line is the left white line LL and the yaw angle θy is equal to or greater than a termination-determination threshold θyrefF which is a negative value. In other words, the condition (b1) is a condition to be satisfied when the objective white line is the left white line LL and when a magnitude (an absolute value) of the yaw angle θy is equal to or smaller than a magnitude (an absolute value) of the termination-determination threshold θyrefF.

The condition (b2) is a condition to be satisfied when the objective white line is the right white line LR and the yaw angle θy is equal to or smaller than a termination-determination threshold θyrefS which is a positive value. In other words, the condition (b2) is a condition to be satisfied when the objective white line is the right white line LR and a magnitude (an absolute value) of the yaw angle θy is equal to or smaller than a magnitude (an absolute value) of the termination-determination threshold θyrefS.

The condition (c) is a condition to be satisfied when the operation switch 13 is operated in such a manner that the lane departure prevention control is not allowed to be performed (that is, when a state of the operation switch 13 is the OFF state).

It should be noted that each of the termination-determination threshold θyrefF and the termination-determination threshold θyrefS is set to an angle observed when the moving/travel direction of the vehicle SV is considered to be approximately parallel to the lane center line Ld.

$$TLDA = K1 \times (Vs^2 \ast Cv) + K2 \times Ds' + K3 \times \theta y \quad (1)$$

Each of K1, K2, and K3 is a control gain.

The K1 is set to a positive value (=k1 (k1>0) when the traveling lane curves to the left, and is set to a negative value (=−k1) when the traveling lane curves to the right.

The K2 is set to a positive value (=k2 (k2>0) when the objective white line is the right white line LR, and is set to a negative value (=−k2) when the objective white line is the left white line LL.

The K3 is set to a positive value.

The Vs is the vehicle speed of the vehicle SV which is detected by the vehicle speed sensor 12a.

The Cv is a curvature (=1/curve radius R>0) of the lane center line Ld which the DSECU has calculated.

The θy is the above-described yaw angle θy.

Figure 3B:
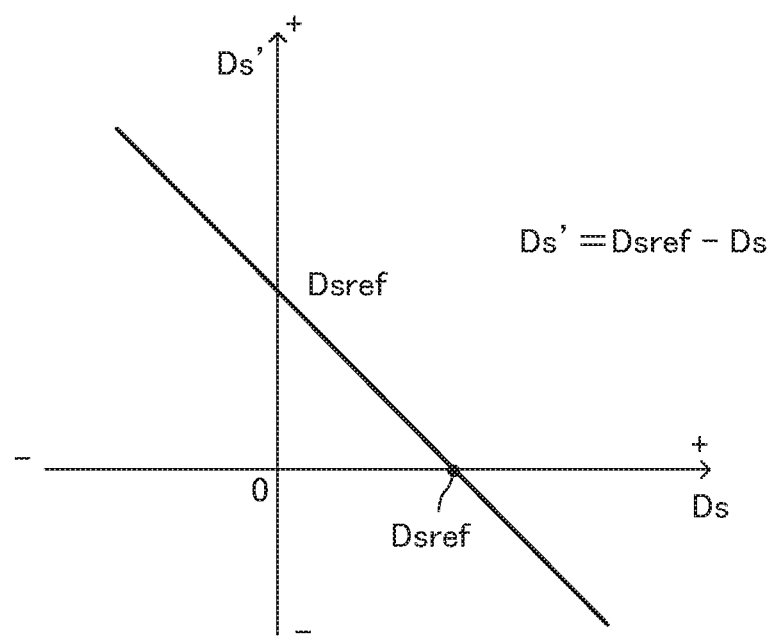
FIG. 3B is a graph showing a relationship between a departure indicator distance Ds' and the side distance Ds.

The Ds' is the departure indicator distance Ds'. The departure indicator distance Ds' is a value (Ds'=Dsref−Ds) obtained by subtracting the side distance Ds from a predetermined reference side distance Dsref. A graph of FIG. 3B shows a relationship between the departure indicator distance Ds' and the side distance Ds.

The first term on the right side of Expression (1) is a torque component (a feedforward amount) determined in accordance with the curvature Cv of the road (traveling lane) and the vehicle speed Vs. That is, the first term on the right side of Expression (1) is the torque component to have the vehicle SV travel in accordance with a curvature Cv of the traveling lane (for example, the lane center line Ld). In other words, the torque component determined by the first term on the right side of Expression (1) is the feedforward amount which is necessary for causing the vehicle SV to travel along the traveling lane and which is determined based on a value corresponding to the curvature Cv of the traveling lane.

The second term on the right side of Expression (1) is a torque component which acts in a feedback control manner so as to prevent the vehicle SV from approaching the objective white line in the road width direction, or so as to cause the vehicle SV to start traveling again inside the traveling lane (at a position in the traveling lane center side) with respect to the objective white line after the vehicle SV has deviated from the traveling lane. That is, the torque component determined by the second term on the right side of Expression (1) is a feedback amount determined based on the side distance Ds (a distance in the road width direction between the reference point P on the vehicle SV and the lane marker) or the departure indicator distance Ds'.

The third term on the right side of Expression (1) is a torque component (a feedback amount with respect to the yaw angle θy) which acts in a feedback control manner so as to reduce a magnitude |θy| of the yaw angle θy (i.e., so as to reduce a deviation in the direction of the vehicle SV with respect to the lane center line Ld). That is, the torque component determined/calculated by the third term on the right side of Expression (1) is the feedback amount determined based on the yaw angle θy so as to reduce the magnitude of the angle (the yaw angle θy) formed between the direction of the traveling lane (for example, the lane center line Ld) and the direction Cd in which the vehicle SV heads.

It should be noted that DSECU may obtain/acquire the LDA target torque TLDA by adding a value K4·(γ*−γ) to the right side of the above-described Expression (1) (i.e., the LDA target torque TLDA=K1×(Vs²*Cv)+K2×Ds'+K3×θy+K4×(γ*−γ)). The K4 is a positive gain. The γ* is the target yaw rate, and is a value to be realized (achieved) based on the sum of the first term on the right side, the second term on the right side, and the third term on the right side of the above-described Expression (1). The γ is the actual yaw rate YRt of the vehicle SV detected by the yaw rate sensor 12b. Therefore, the value K4·(γ*−γ) is a torque component (a feedback amount with respect to the yaw rate) which acts in a feedback control manner so as to reduce a deviation between the target yaw rate γ* and the actual yaw rate YRt.

Furthermore, the DSECU may calculate the sum of the first term and the second term on the right side of the above-described Expression (1) as the LDA target torque TLDA, as shown in the following Expression (1').

$$TLDA = K1 \times (Vs^2 \times Cv) + K2 \times Ds' \quad (1')$$

That is, as apparent from Expression (1) and Expression (1'), the DSECU may calculate the LDA target torque TLDA (the target steering assist force) as a force/torque including the feedforward amount determined based on a value corresponding to the curvature Cv of the traveling lane and the feedback amount determined based on the side distance Ds.

Here, for example, when the vehicle SV is traveling at a constant speed (a constant vehicle speed Vs) along the lane center line Ld which has a constant curve radius R and curves to the left, suppose that the following situation has occurred. The vehicle SV is about to deviate from the right white line LR of the traveling lane (that is, the side distance Ds becomes equal to or smaller/shorter than the reference side distance Dsref), because the curve radius R is excessively small with respect to the vehicle speed Vs.

In this case, the control gain K1 is set to the positive value k1, so that the first term (K1×(Vs²×Cv)) on the right side of Expression (1) becomes a positive value. Since the control gain K2 is set to the positive value k2 and the departure indicator distance Ds' is a positive value, the second term (K2×Ds') on the right side of Expression (1) becomes a positive value. Furthermore, since the control gain K3 has been set to a positive value and the vehicle SV is about to deviate/depart from the right white line LR, the yaw angle θy becomes a positive value. Therefore, the third term (K3×θy) on the right side of Expression (1) also becomes a positive value. Consequently, the LDA target torque TLDA becomes a positive value. That is, the LDA target torque TLDA becomes a torque to generate/cause a yaw rate observed when the vehicle SV turns leftward while traveling forward.

The DSECU transmits a steering command specifying the determined LDA target torque TLDA to the EPS·ECU 20, every time the predetermined time elapses. The EPS·ECU 20 drives the steering motor 22 based on the LDA target torque TLDA specified by the steering command, thereby applying the steering assist torque (the steering assist force, the departure prevention torque) equal to the LDA target torque TLDA to the steering mechanism. The above description is the outline of the lane departure prevention control.

It should be noted that the control target amount used in the lane departure prevention control is the LDA target torque TLDA, as described above. However, that control target amount may be a target yaw rate in place of the LDA target torque TLDA. That is, the left side of Expression (1) may be the target yaw rate of the vehicle SV. In this case, for example, the DSECU receives the detection signal of the yaw rate sensor 12*b*, and calculates the deviation between the target yaw rate and the actual yaw rate YRt. Thereafter, the DSECU calculates the target torque (the steering assist torque) to be generated by the steering motor 22 with reference to a lookup table which defines the relationship between the deviation, the vehicle speed, and the target torque.

<Outline of Operation>

When the DSECU performs the lane departure prevention control (that is, when the DSECU applies the departure prevention torque to the steering mechanism), the DSECU vibrates using the vibration actuator 33 or does not vibrate the steering wheel SW in accordance with the curvature Cv indicative of at least the shape of the traveling lane (road) in which the vehicle SV is traveling. The vibration of the steering wheel SW with the vibration actuator 33 is also referred to as "steering wheel vibration for notification/alert" or "vibration notification/alert". The lane departure prevention control without the steering wheel vibration for notification is also referred to as a "lane departure control without the vibration notification/alert" or a "first control". The lane departure prevention control with the vibration of the steering wheel for notification is also referred to as a "lane departure control with the vibration notification/alert" or a "second control".

Meanwhile, for example, when the vehicle SV travels within a straight section of the road (in other words, when the traveling lane is substantially straight), the curvature Cv of the traveling lane is relatively small. For this reason, the magnitude of the first term (=K1·(Vs$^2$×Cv)) on the right side of Expression (1) is relatively small. Therefore, when the traveling lane is substantially straight, the departure prevention torque applied to the steering mechanism owing to the lane departure prevention control tends to be relatively small. Therefore, even when the travel lane is substantially straight and the departure prevention torque is applied to the steering mechanism, a case easily occurs where the driver does not notice (an occurrence of) the specific state where the vehicle SV is highly likely to (or is about to) deviate/ depart from the traveling lane (that is, the driver dose not notice the specific state where intervention in the steering control is occurring owing to the lane departure prevention control).

Therefore, when the traveling lane is substantial straight and the departure prevention torque is applied to the steering mechanism, if the steering wheel SW is vibrated using the vibration actuator 33, it is possible to reliably and certainly notify the driver of the occurrence of "the specific state where the vehicle SV is about to deviate/depart from the traveling lane" with the vibration of the steering wheel SW.

In contrast, for example, if the vehicle SV is traveling within a curved section of the road (in other words, the traveling lane is curved), the curvature Cv of the traveling lane is relatively large. For this reason, a magnitude of the first term on the right side of the above-described Expression (1) (=K1×(Vs$^2$×Cv)) is relatively large.

Furthermore, according to the inventor's study, the magnitude of the yaw angle θy observed when the vehicle SV is about to deviate from the curved traveling lane toward the outer periphery side of the lane (toward the outside of the curve) tends to be larger than the magnitude of the yaw angle θy observed when the vehicle SV is about to deviate from the curved traveling lane toward the inner periphery side of the lane (toward the inside of the curve). Therefore, the magnitude of the third term (=K3×θy) on the right side of the above-described Expression (1) when the vehicle SV is about to deviate from the curved traveling lane toward the outer periphery side of the lane tends to be larger than the magnitude of the third term on the right side of the above-described Expression (1) when the vehicle SV is about to deviate from the curved traveling lane toward the inner periphery side of the lane.

Therefore, when the vehicle SV is about to deviate from the curved traveling lane toward the outer periphery side of the lane, the magnitude of the departure prevention torque applied to the steering mechanism owing to the lane departure prevention control tends to be relatively large. Therefore, in this case, the departure prevention torque having a relatively large magnitude is applied to the steering mechanism. Accordingly, even if the steering wheel SW is not vibrated using the vibration actuator 33, the driver is relatively highly likely to recognize that the specific state occurs where the vehicle SV is about to deviate from the traveling lane (in other words, the driver can notice the specific state where intervention in the steering control is occurring owing to the lane departure prevention control, without the vibration of the steering wheel SW).

On the other hand, as described above, when the vehicle SV is about to deviate from the curved traveling lane toward the inner periphery side of the lane, the magnitude of the yaw angle θy is relatively small. In addition, in this case, the first term (=K1×(Vs$^2$×Cv)) on the right side of Expression (1) and at least any one of the second term (=K2×Ds') and the third term (=K3×θy) on the right side of Expression (1) often have opposite signs to each other. Therefore, the magnitude of the departure prevention torque applied to the steering mechanism owing to the lane departure prevention control does not tend to be sufficiently large. Therefore, in this case, as in the case of when the traveling lane is straight, even when the departure prevention torque is applied to the steering mechanism, a case easily occurs where the driver does not notice the specific state where the vehicle is about to deviate from the traveling lane (in other words, the driver cannot notice the specific state where intervention in the steering control is occurring owing to the lane departure prevention control).

Accordingly, even when the traveling lane is the curved lane, and if the vehicle SV is about to deviate from the curved traveling lane toward the inner periphery side of the lane, it is desirable/preferable that the vibration actuator 33 vibrate the steering wheel SW. The vibration of the steering wheel SW using the vibration actuator 33 can reliably/ certainly notify the driver of "the occurrence of the specific state where the vehicle SV is about to deviate from the traveling lane".

Figure 4:
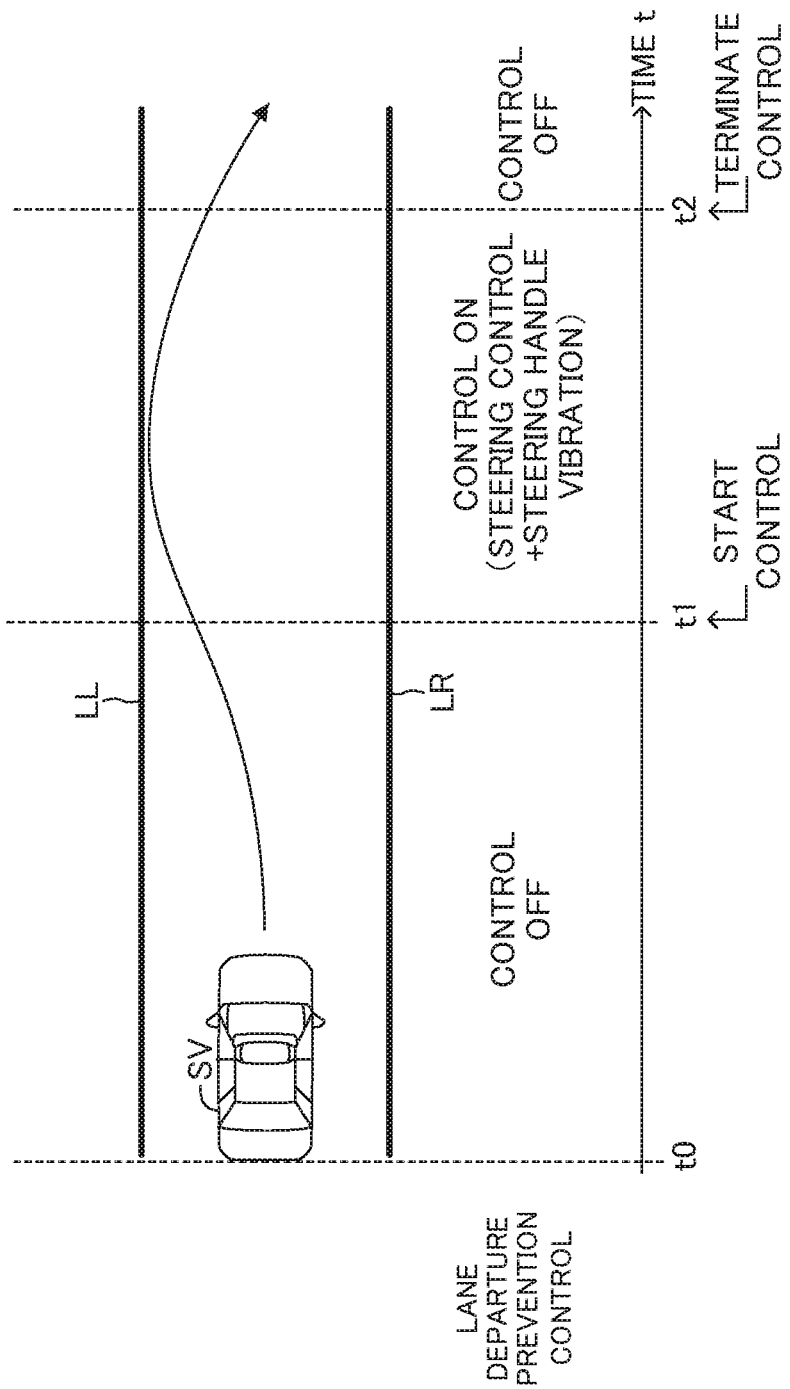
FIG. 4 is a time chart for explaining an outline of operation of the first embodiment apparatus.

In view of the above, when the LDA start condition is satisfied while the vehicle SV is traveling within the straight section of the road/lane, and thus, the DSECU performs the lane departure prevention control, the DSECU performs "the lane departure prevention control with the vibration notification" which is the second control (refer to the period from time t1 at which the LDA start condition becomes satisfied to time t2 at which the LDA termination condition becomes satisfied, shown in FIG. 4).

Figure 5:
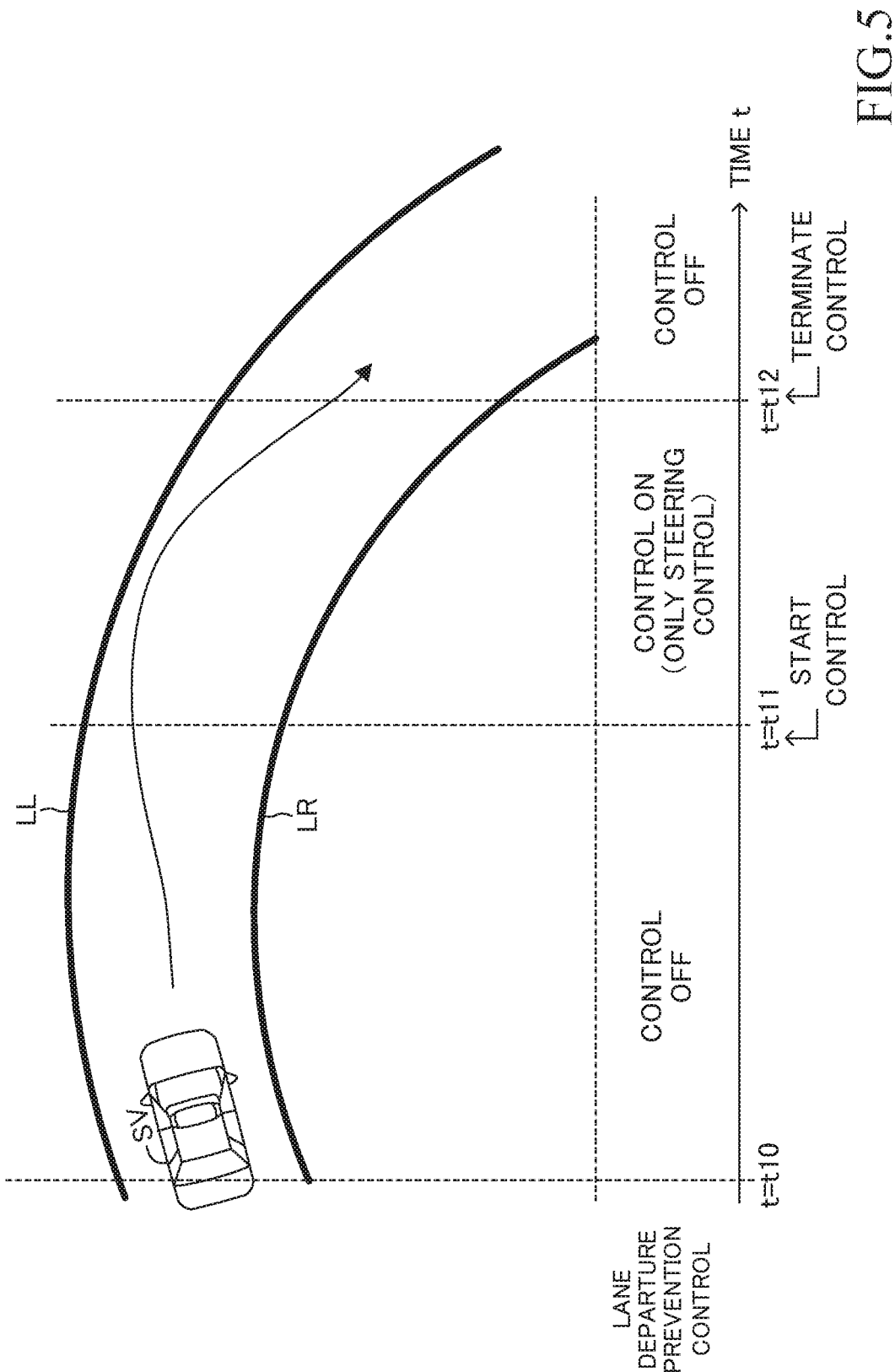
FIG. 5 is a time chart for explaining the outline of operation of the first embodiment apparatus.

On the other hand, when the vehicle SV is about to deviate from the traveling lane toward an outer side of the curve while traveling within the curved section of the road/lane, and thus, the LDA start condition becomes satisfied, the DSECU performs "the lane departure prevention control without the vibration notification" which is the first control (refer to the period from time t11 at which the LDA start condition becomes satisfied to time t12 at which the LDA termination condition becomes satisfied, shown in FIG. 5).

It should be noted that the DSECU performs the lane departure prevention control with the vibration notification when the vehicle SV is about to deviate from the traveling lane toward an inner side of the curve while traveling within the curved section of the road/lane so that the LDA start condition becomes satisfied, as described above. Alternatively, in this case, the DSECU may perform the lane departure prevention control without the vibration notification.

As described above, the first embodiment apparatus vibrates the steering wheel SW using the vibration actuator 33 when the driver is hard to notice the intervention of the steering control for the lane departure prevention (or that the departure prevention torque is being applied to the steering mechanism). Therefore, the first embodiment apparatus can reliably and certainly notify the driver of "the occurrence of the situation where the vehicle SV is about to deviate from the traveling lane".

Furthermore, the first embodiment apparatus does not vibrate the steering wheel SW with the vibration actuator 33 when the driver easily notices the intervention of the steering control for the lane departure prevention (that the departure prevention torque is being applied to the steering mechanism). As a result, the first embodiment apparatus can reduce "the frequency of occurrence of the state where the vibration of the steering wheel SW causes the driver to feel annoyed".

<<Specific Operation>>

The CPU of the DSECU (hereinafter, simply referred to as the "CPU") executes a routine shown by a flowchart in FIG. 6, every time a predetermined time elapses.

Therefore, when an appropriate timing arrives, the CPU starts processing from step 600 shown in FIG. 6 to sequentially execute processes of steps 605 and 610 described below, and then proceeds to step 615.

Step 605: the CPU recognizes the white lines (the left white line LL and the right white line LR, that is, the lane defining lines on the left and right sides of the vehicle SV) using the camera sensor 11.

Step 610: the CPU calculates (acquires/obtains) the curvature Cv of the lane (the traveling lane) in which the vehicle SV is traveling, based on the recognized white lines.

At step 615, the CPU determines whether or not a value of an LDA execution flag XLDA is "0".

The LDA execution flag XLDA indicates that the lane departure prevention control is being performed (that the departure prevention torque is being applied to the steering mechanism) when its value is "1". The LDA execution flag XLDA indicates that the lane departure prevention control is not being performed (the departure prevention torque is not being applied to the steering mechanism) when its value is "0". It should be noted that the value of the LDA execution flag XLDA is set to "0" in an initialization routine executed by the CPU when an unillustrated ignition key switch (not shown) of the vehicle SV is changed from the OFF position to the ON position.

When the value of the LDA execution flag XLDA is "0", the CPU makes a "Yes" determination at step 615 and proceeds to step 620 to determine whether or not the above-described LDA start condition is satisfied. When the LDA start condition is not satisfied, the CPU makes a "No" determination at step 620 and proceeds to step 695 to tentatively terminate the present routine.

In contrast, when the LDA start condition is satisfied, the CPU makes a "Yes" determination at step 620 and proceeds to step 625 to set the value of the LDA execution flag XLDA to "1". Next, the CPU proceeds to step 627 to calculate the LDA target torque TLDA using the above-described Expression (1). Thereafter, the CPU proceeds to step 630.

On the other hand, when the value of the LDA execution flag XLDA is "1" at the time point at which the CPU executes the process of step 615, the CPU makes a "No" determination at step 615 to directly proceed to step 627, and then proceeds to step 630.

At step 630, the CPU determines whether or not the vehicle SV is traveling within the curved section based on the curvature Cv of the traveling lane which has been calculated at step 610 (that is, the CPU determines whether or not the traveling lane is the curved road/lane). More specifically, the CPU determines whether or not the curvature Cv is equal to or greater than a threshold curvature Cvth (in other words, whether or not the curve radius R is equal to or smaller than a threshold radius Rth), at step 630.

If the curvature Cv is smaller than the threshold curvature Cvth, it is considered that the vehicle SV is not traveling within the curved section and is traveling within the straight section (the traveling lane is straight). In this case, the CPU makes a "No" determination at step 630 and proceeds to step 635 to perform the lane departure prevention control with the vibration notification (the second control). That is, the CPU transmits the steering command including the LDA target torque TLDA calculated in accordance with Expression (1) to the EPS·ECU 20 and transmits the command for requesting the vibration of the steering wheel SW to the alert ECU 30 to perform the lane departure prevention control with the vibration notification. Thereafter, the CPU proceeds to step 665.

In contrast, if the curvature Cv of the traveling lane which has been calculated at step 610 is equal to or greater than the threshold curvature Cvth, it is considered that the vehicle SV is traveling within the curved section (the traveling lane is curved). In this case, the CPU makes a "Yes" determination at step 630 and proceeds to step 640 to determine whether or not the vehicle SV is about to deviate from the traveling lane toward an outer side of the curved lane. In other words, the CPU determines whether or not the objective white line is the white line on an outer peripheral side of the curved lane.

If the white lines (the left white line LL and the right white line LR) which have been recognized by the CPU curve to the left with respect to the vehicle travel direction and the above-described objective white line is the right white line LR, it is considered that the vehicle SV is about to deviate from the traveling lane toward the outer side of the curved lane. Similarly, if the white lines which have been recognized by the CPU curve to the right with respect to the vehicle travel direction and the above-described objective white line is the left white line LL, it is considered that the vehicle SV is about to deviate from the traveling lane toward the outer side of the curved lane.

Therefore, in any of those cases described above, the CPU makes a "Yes" determination at step 640 and proceeds to step 660 to perform the lane departure prevention control without the vibration notification (the first control). That is, the CPU transmits the steering command including the LDA target torque TLDA calculated in accordance with Expression (1) to the EPS·ECU 20. In this case, the CPU does not transmit the command for requesting the vibration of the steering wheel SW to the alert ECU 30. Thereafter, the CPU proceeds to step 665.

In contrast, if the white lines which have been recognized by the CPU curve to the left with respect to the vehicle travel direction and the above-described objective white line is the left white line LL, it is considered that the vehicle SV is about to deviate from the traveling lane toward an inner side of the curved lane. Similarly, if the white lines which have been recognized by the CPU curve to the right with respect to the vehicle travel direction and the above-described objective white line is the right white line LR, it is considered that the vehicle SV is about to deviate from the traveling lane toward the inner side of the curved lane.

Therefore, in any of those cases described above, the CPU makes a "No" determination at step 640 and proceeds to step 635 to perform the lane departure prevention control with the vibration notification. Thereafter, the CPU proceeds to step 665.

At step 665, the CPU determines whether or not the above-described LDA termination condition is satisfied. When the LDA termination condition is not satisfied, the CPU makes a "No" determination at step 665 and directly proceeds to step 695 to tentatively terminate the present routine.

In contrast, when the LDA termination condition is satisfied, the CPU makes a "Yes" determination at step 665 and sequentially executes processes of steps 670 and 675 described below, and then proceeds to step 695 to tentatively terminate the present routine.

Step 670: the CPU terminates/ends the calculation of the LDA target torque TLDA using Expression (1). That is, the CPU sets the LDA target torque TLDA to "0" and terminates/ends the lane departure prevention control.

Step 675: the CPU sets the value of the LDA execution flag XLDA to "0".

As described above, according to the first embodiment apparatus, the vibration of the steering wheel SW is not performed during performing the lane departure prevention control when the vibration has a low necessity. Consequently, it is possible to reduce the frequency of causing the driver to feel annoyed. On the other hand, according to the first embodiment apparatus, when the driver is hard to notice that the vehicle SV is about to deviate from the traveling lane only by the departure prevention torque applied to the steering mechanism during performing the lane departure prevention control, the steering wheel SW is vibrated. Therefore, the first embodiment apparatus can more reliably and certainly notify the driver of the occurrence of the state where the vehicle SV is about to deviate from the traveling lane.

Second Embodiment

Next, the lane departure prevention apparatus according to the second embodiment of the present invention (hereinafter, referred to as a "second embodiment apparatus" in some cases) will be described.

The second embodiment apparatus is different from the first embodiment apparatus only in the following point. The second embodiment apparatus continuously performs the "lane departure prevention control with the vibration notification for a predetermined time (a predetermined period) from a time point at which it is determined that the vehicle SV is about to deviate from the traveling lane toward the outer side of the curved lane (the outer peripheral side of the curved road/lane) and thereafter it performs the "lane departure prevention control without the vibration notification".

That is, when the vehicle SV is about to deviate from the traveling lane toward the outer side of the curved lane (the outer peripheral side of the curved road/lane), and thus, when the LDA start condition becomes satisfied, the second embodiment apparatus performs the lane departure prevention control with the vibration notification for a predetermined time t1th (a threshold time t1th) in a period from a time point at which the LDA start condition becomes satisfied to a time point at which the LDA termination condition becomes satisfied (a period in which the control performing condition is satisfied), and thereafter, it performs the lane departure prevention control without the vibration notification.

Figure 7:
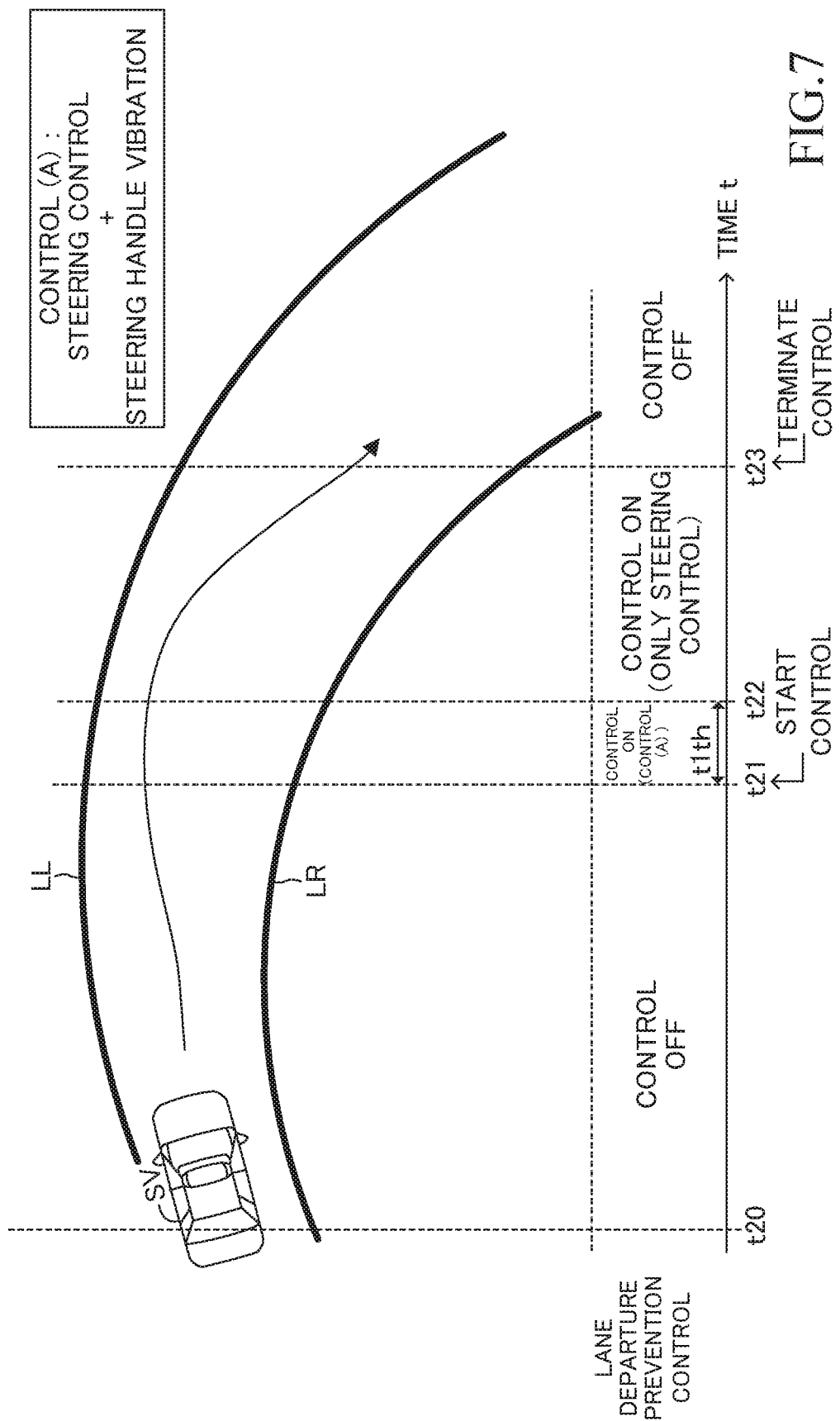
FIG. 7 is a time chart for explaining an outline of operation of a lane departure prevention apparatus (the second embodiment apparatus) according to a second embodiment of the present invention.

For example, in an example shown in FIG. 7, the vehicle SV is traveling within the curved section after time t20. At the time t21, the vehicle SV is about to deviate from the traveling lane toward the outer side of the curve, and thus, the LDA start condition becomes satisfied. Thereafter the LDA termination condition becomes satisfied at time t23 at which the threshold time t1th elapses from the time t21. In this case, the second embodiment apparatus performs "the lane departure prevention control with the vibration notification" from the time t21 to the time t22. Furthermore, the second embodiment apparatus performs "the lane departure prevention control without the vibration notification" from the time t22 to the time t23.

Figure 6:
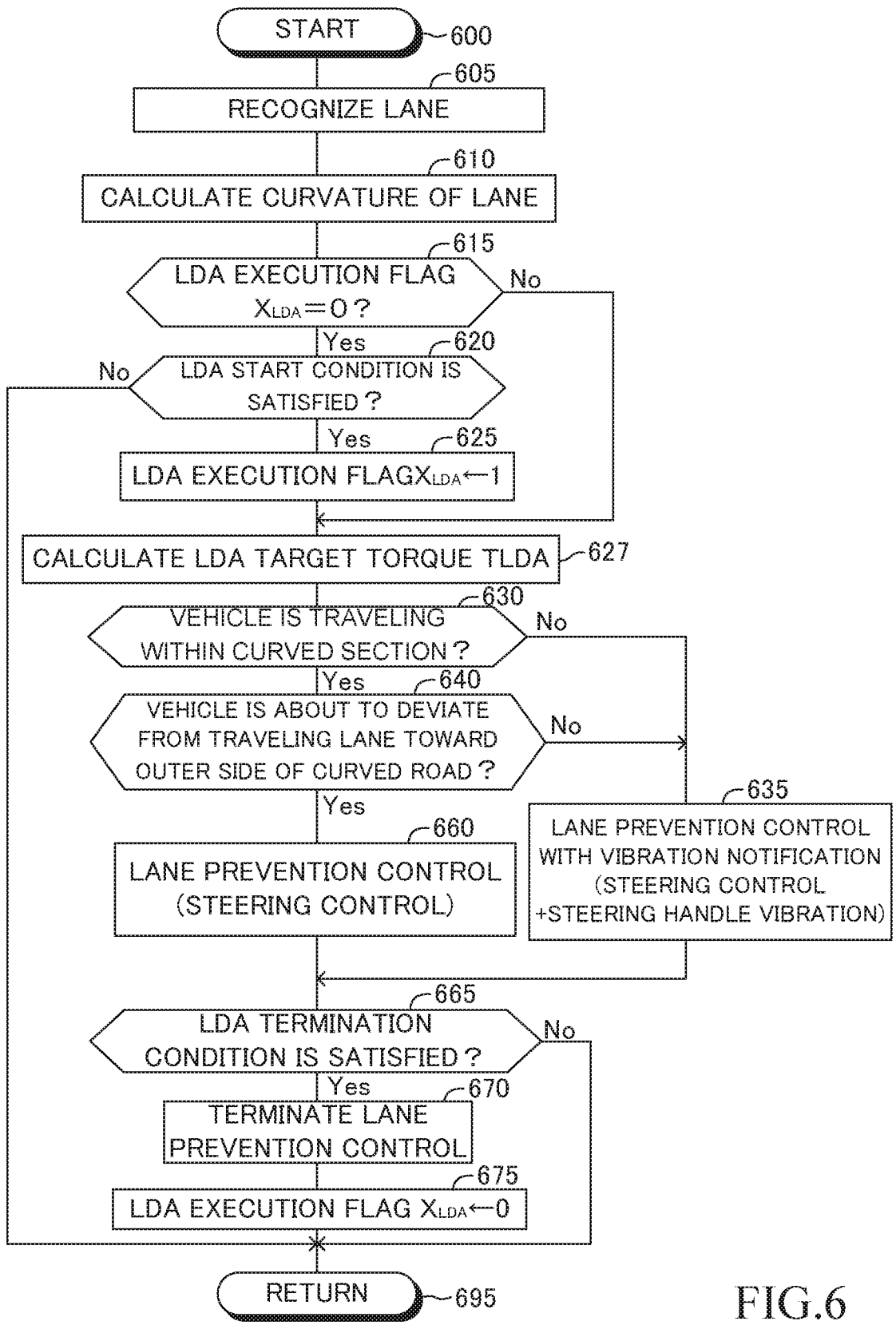
FIG. 6 is a flowchart for illustrating a routine executed by a CPU of a driving support ECU shown in FIG. 1.
Figure 8:
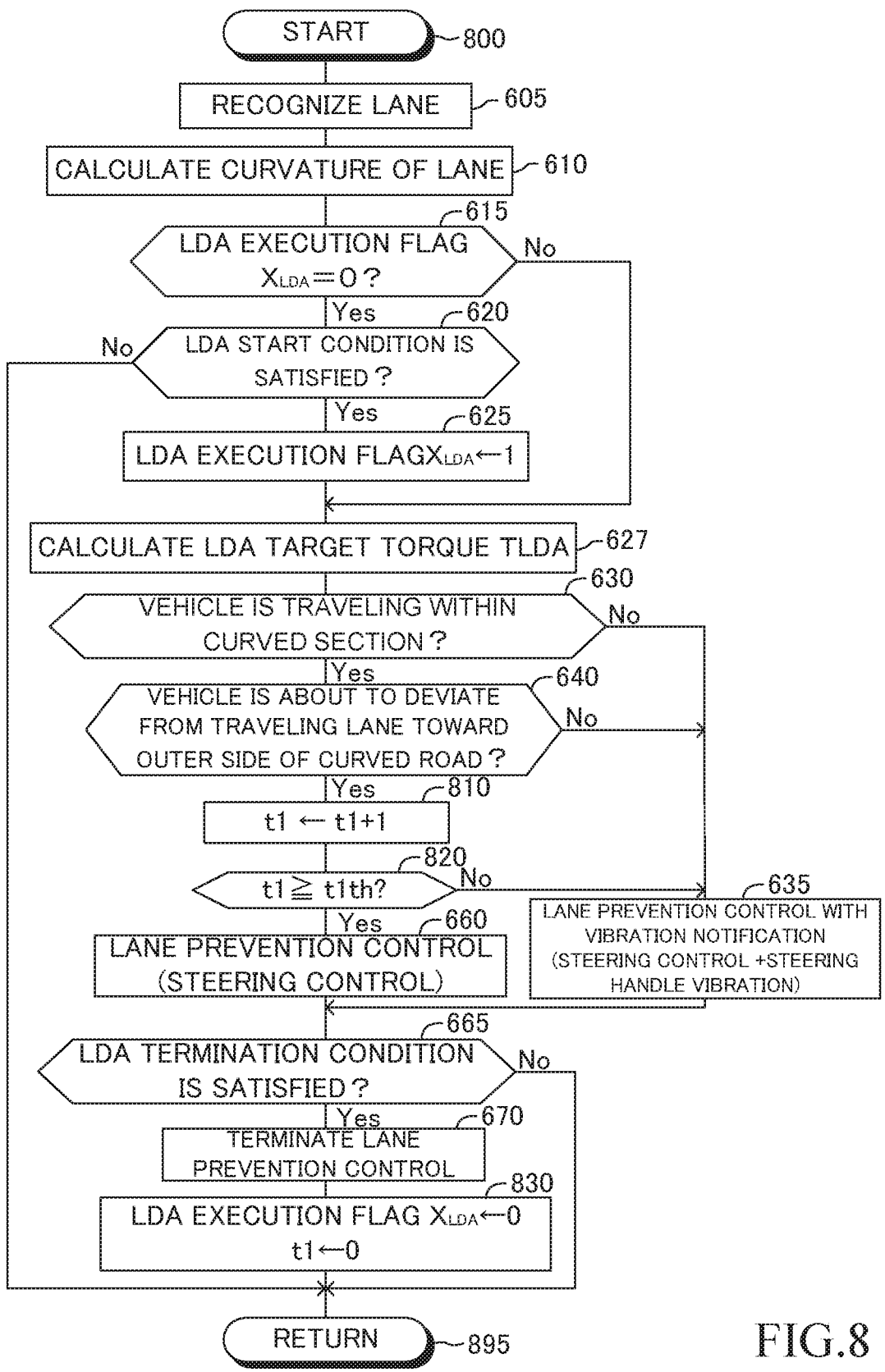
FIG. 8 is a flowchart for illustrating a routine executed by a CPU of a driving support ECU included in the second embodiment apparatus.

More specifically, the CPU of the DSECU of the second embodiment executes the routine shown in FIG. 8 in place of the routine shown in FIG. 6. The routine shown in FIG. 8 is different from the routine shown in FIG. 6 only in that steps 810 and 820 are added between step 635 and step 660 of the routine shown in FIG. 6 and step 675 shown in FIG. 6 is replaced by step 830. Therefore, in the following descriptions, the processing in these different steps will be mainly described.

When the CPU determines at step 640 that the vehicle SV is about to deviate from the traveling lane toward the outer side of the curve, the CPU proceeds to step 810 to increment the value of the timer t1 by one.

The value of the timer t1 indicates a time (length) for which a state continues where the vehicle SV is about to deviate from the traveling toward the outer side of the curve after a time point at which the LDA start condition becomes satisfied and it is determined that the vehicle SV is about to deviate from the traveling lane toward the outer side of the curve. It should be noted that the value of the timer t1 is set to "0" by the above-described initialization routine. Furthermore, the value of the timer t1 is set (cleared) to "0" at step 830.

Next, the CPU proceeds to step 820 to determine whether or not the value of the timer t1 is equal to or greater than the threshold time t1th. When the value of the timer t1 is smaller than the threshold time t1th, the CPU makes a "No" determination at step 820 and proceeds to step 635 to perform the lane departure prevention control with the vibration notification.

Thereafter, the CPU proceeds to step 665 to determine whether or not the LDA termination condition is satisfied. When the LDA termination condition is not satisfied, the CPU makes a "No" determination at step 665 and directly proceeds to step 895 to tentatively terminate the present routine. Therefore, in a period from a time point at which it is determined that the vehicle SV is about to deviate from the traveling lane toward the outer side of the curve to a time point at which the LDA termination condition becomes satisfied, the process of the step 810 is repeatedly performed so that the timer t1 gradually increases as long as the vehicle SV has a probability of deviating from the traveling lane toward the outer side of the curve.

When the CPU proceeds to step 820 after the value of the timer t1 becomes equal to or greater than the threshold time t1th, the CPU makes a "Yes" determination at step 820 and proceeds to step 660 to perform the lane departure prevention control without the vibration notification.

As a result of the execution of these processes, when the vehicle SV has the probability of deviating from the traveling lane toward the outer side of the curved lane, the lane departure prevention control with the vibration notification is performed for the period from the time point at which it is determined that there is such a probability to the time point at which the threshold time t1th elapses. Thereafter, the lane departure prevention control without the vibration notification is performed.

It should be noted that the CPU may set the value of the timer t1 to "0" when the CPU makes a "No" determination at step 630. Furthermore, the CPU may also set the value of the timer t1 to "0" when the CPU determines makes a "No" determination at step 640.

In a period (hereinafter, referred to as a "specific initial period") immediately after a time point at which the vehicle has a probability of departing from the traveling lane toward the outer side of the curved lane, the magnitude of the departure prevention torque is highly likely to be relatively small. This is because the magnitude of the "second term of the right side and/or the third term on the right side" of the above-described Expression (1) is highly likely to be relatively small in the specific initial period. Therefore, in the specific initial period, the vibration of the steering wheel SW makes it possible to more reliably and certainly notify the driver that the vehicle SV is about to deviate from the traveling lane.

Therefore, according to the second embodiment apparatus, it is possible to more reliably and certainly notify the driver of the occurrence of the specific state/situation where the vehicle SV is about to deviate from the traveling lane. Furthermore, the second embodiment apparatus vibrates the steering wheel SW when the necessity for vibrating the steering wheel SW is high. Thus, the second embodiment apparatus can reduce "the frequency of the occurrence of the state where the vibration of the steering wheel SW causes the driver to feel annoyed".

First Modified Example

A lane departure prevention apparatus (hereinafter, referred to as the "first modified apparatus" in some cases) according to the first modified example is different from the first embodiment apparatus only in the following point. It should be noted that the features of the first modified apparatus can also be applied to the second embodiment apparatus.

The CPU of the first modified apparatus determines whether or not the vehicle SV is traveling in the curve at step 630 shown in FIG. 6 as follows.

The CPU determines that the vehicle SV is traveling within the curved section when a magnitude of the yaw rate (an absolute value of the actual yaw rate YRt) is equal to or greater than a threshold value. The CPU determines that the vehicle SV is traveling within the straight section when the magnitude of the yaw rate (the absolute value of the actual yaw rate YRt) is smaller than the threshold value.

Second Modified Example

A lane departure prevention apparatus (hereinafter, referred to as the "second modified apparatus" in some cases) according to the second modified example is different from the first embodiment apparatus only in the following point. It should be noted that the features of the second modified apparatus can also be applied to the second embodiment apparatus.

The CPU of the second modified apparatus determines whether or not the vehicle SV is traveling in the curve at step 630 shown in FIG. 6 as follows. That is, when an absolute value of the LDA target torque TLDA at or immediately after a time point at which the LDA start condition becomes satisfied is equal to or greater than a threshold, the CPU determines that the vehicle SV is traveling in the curved lane. When the absolute value of the LDA target torque TLDA at or immediately after the time point at which the LDA start condition becomes satisfied is smaller than the threshold, the CPU determines that the vehicle SV is traveling in the straight lane.

Although each of the embodiments and each of the modified examples of the present invention have been specifically described, the present invention is not limited to the above-described embodiments and the modified examples, and various modifications based on the technical idea of the present invention are possible.

For example, each of the above-described embodiment apparatuses and the modified apparatuses may acquire/obtain the curvature Cv of the traveling lane from the navigation ECU 40 at step 610.

For example, step 640 may be omitted shown in the routines of FIG. 6 and FIG. 8. In other words, the CPU of the DSECU may be configured to execute the routine of FIG. 9 in place of FIG. 6 or the routine of FIG. 10 in place of FIG. 8.

Figure 9:
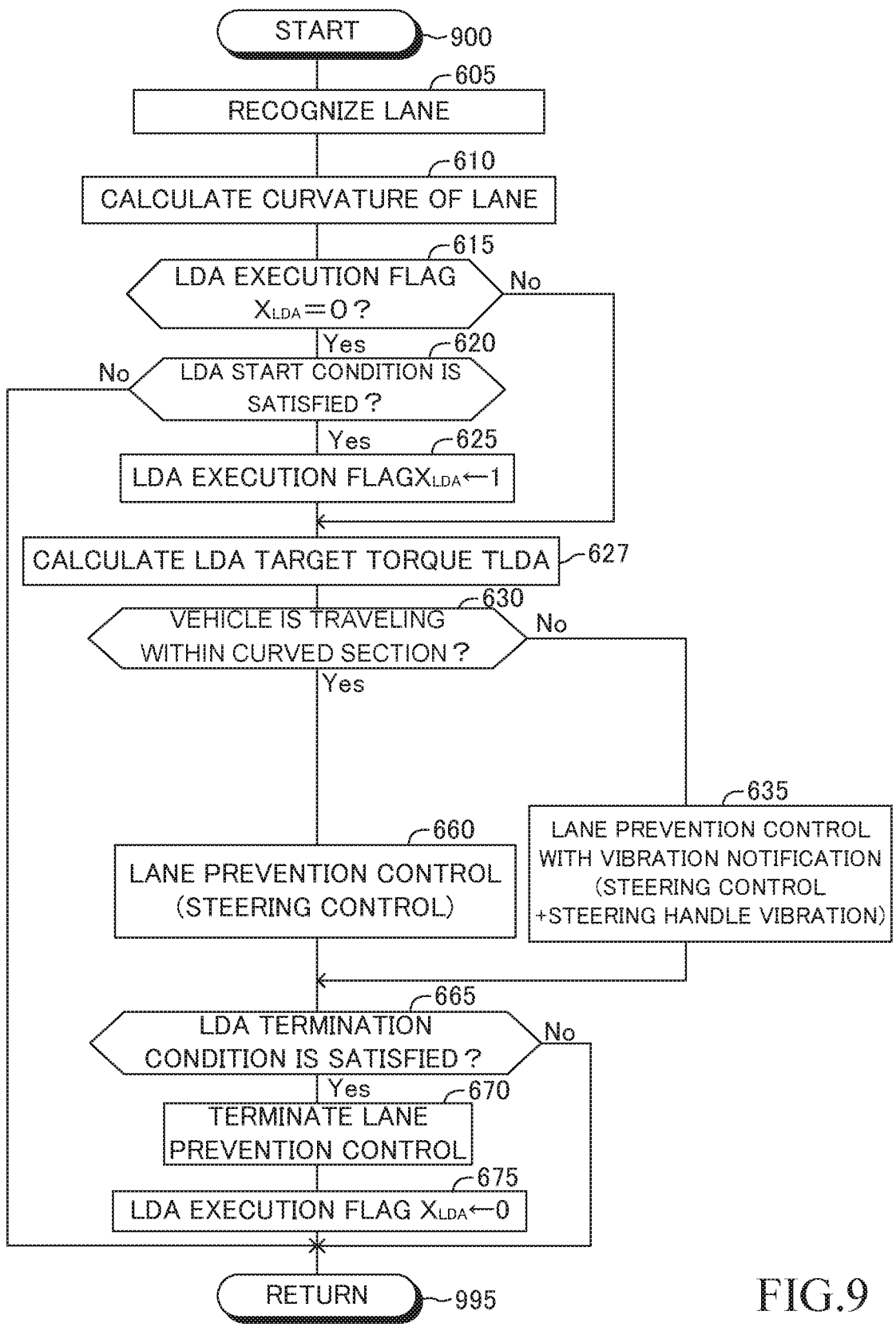
FIG. 9 is a flowchart for illustrating a routine executed by a CPU of a lane departure prevention apparatus according to a modified example of the first embodiment apparatus.

According to the routine of FIG. 9, when it is determined that the traveling lane is the curved road/lane (step 630: Yes) after the above-described LDA start condition is satisfied (step 620: Yes), the lane departure prevention control without the vibration notification is performed regardless of whether the vehicle SV is about to deviate from the traveling lane toward the outer periphery side or the inner periphery side of the curved road/lane.

As a result, when the vehicle SV is traveling in the curved lane, the notification by the vibration of steering wheel SW which has a low necessity is not performed. Consequently, it is possible to reduce the frequency of causing the driver to feel annoyed. Furthermore, when the vehicle SV is traveling in the straight lane, the notification by the vibration of steering wheel SW is performed. Consequently, it is possible to more reliably notify the driver that the vehicle SV is about to deviate from the traveling lane.

Figure 10:
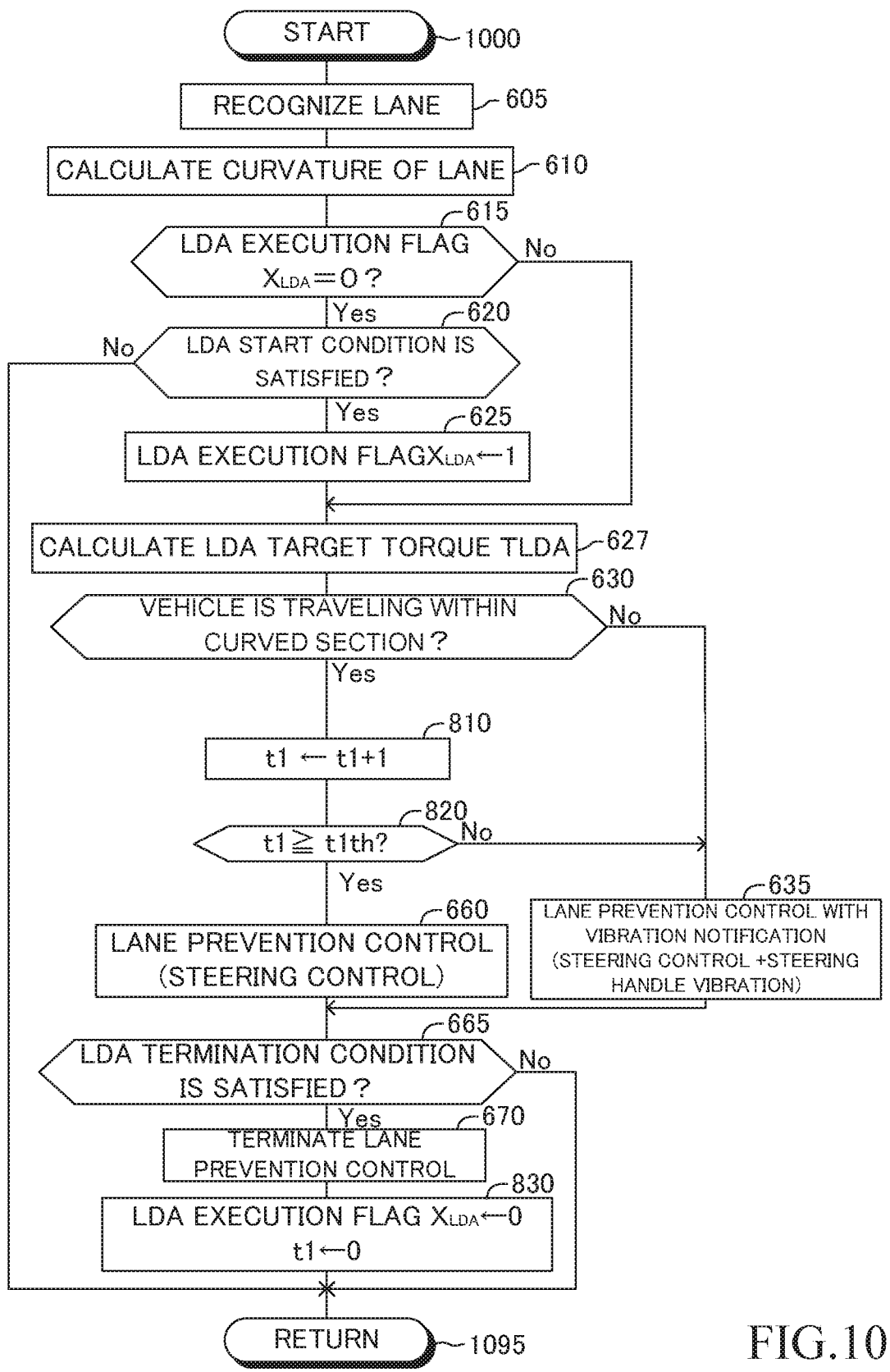
FIG. 10 is a flowchart for illustrating a routine executed by a CPU of a lane departure prevention apparatus according to a modified example of the second embodiment apparatus.

Furthermore, according to the routine shown in FIG. 10, when it is determined that the traveling lane is the curved road/lane (step 620: Yes) after the above-described LDA start condition becomes satisfied (step 630: Yes), the lane departure prevention control with the vibration notification is performed for the predetermined time t1th regardless of whether the vehicle SV is about to deviate from the traveling lane toward the outer periphery side or the inner periphery side of the curved road/lane, and thereafter, the lane departure prevention control without the vibration notification is performed.

Consequently, when the predetermined time t1th has elapsed from the time point at which the LDA start condition becomes satisfied while the vehicle SV is traveling in the curved lane, the notification by the vibration of steering wheel SW which has a low necessity is not performed. Therefore, it is possible to reduce the frequency of causing the driver to feel annoyed. Furthermore, while the vehicle SV is traveling in the straight lane, the notification by the vibration of steering wheel SW is performed. Accordingly, it is possible to more reliably notify the driver that the vehicle SV is about to deviate from the traveling lane.

In addition, each of the above-described embodiments and the modified apparatuses may vibrate the steering wheel SW by applying/superimposing the vibrating steering assist torque for vibrating the steering wheel SW to the steering mechanism, without using the vibration actuator 33.

More specifically, when performing the lane departure prevention control without the vibration notification, the DSECU calculates the LDA target torque TLDA in accordance with the above-described Expression (1). Furthermore, when performing the lane departure prevention control with the vibration notification, the DSECU calculates the LDA target torque TLDA in accordance with the Expression (2) described below. In Expression (2), the function f(t) is a function providing a value which oscillates periodically with respect to the time t. For example, the function f(t) may be a function providing values in accordance with a "sine wave, triangle wave, square wave, or the like", each wave having a predetermined amplitude and a short period.

$$TLDA = K1 \times (Vs^2 \times Cv) + K2 \times Ds' + K3 \times \theta y + f(t) \quad (2)$$

Furthermore, at step 660 and step 635, each of the above-described embodiments and the modified apparatuses may transmit the command to the alert ECU 30 to use the buzzer 31 and/or the display device 32, so as to notify the driver that the lane departure prevention control is being performed using the buzzer 31 and/or the display device 32.

What is claimed is:

1. A lane departure prevention apparatus comprising:
    a lane marker recognition section for recognizing lane markers on a road on which a vehicle is traveling;
    an electric motor capable of changing a turning angle of said vehicle by applying a steering assist force to a steering mechanism including a steering wheel of said vehicle; and
    a control unit, when determining that a control performing condition is satisfied, said control performing condition being satisfied when said vehicle has a high probability of departing from a traveling lane defined by said recognized lane markers:
        for determining a target steering assist torque for changing said turning angle in such a manner said vehicle does not depart from said traveling lane; and
        for performing a lane departure prevention control to drive said electric motor in such a manner that torque corresponding to said determined target steering assist torque is applied to said steering mechanism,
    wherein,
    said control unit is configured:
        to determine whether said traveling lane is straight or curved;
        to perform said lane departure prevention control with vibrating said steering wheel when it determines that said control performing condition is satisfied and said traveling lane is straight; and
        to perform said lane departure prevention control without vibrating said steering wheel when it determines that said control performing condition is satisfied and said traveling lane is curved and at least in a case where said vehicle has a high probability of departing from said traveling lane toward an outer side of said traveling lane.

2. The lane departure prevention apparatus according to claim 1,
    wherein,
    said control unit is configured to perform said lane departure prevention control with vibrating said steering wheel when it determines that said control performing condition is satisfied and said traveling lane is curved and in a case where said vehicle has a high probability of departing from said traveling lane toward an inner side of said lane.

3. The lane departure prevention apparatus according to claim 1,
    wherein,
    said control unit is configured, when it determines that said control performing condition is satisfied and said traveling lane is curved, to perform said lane departure prevention control without vibrating said steering wheel, regardless of whether said vehicle is about to depart from said traveling lane toward an inner side or said outer side of said lane.

4. The lane departure prevention apparatus according to claim 1,
    wherein,
    said control unit is configured:
        to perform said lane departure prevention control with vibrating said steering wheel for a predetermined time when it determines that said control performing condition is satisfied and said traveling lane is curved and at least in said case where said vehicle has a high probability of departing from said traveling lane toward said outer side of said traveling lane; and
        to thereafter perform said lane departure prevention control without vibrating said steering wheel.

5. The lane departure prevention apparatus according to claim 1, further comprising a vibration actuator, which is installed in said steering wheel and configured to vibrate said steering wheel,
    wherein,
    said control unit is configured to vibrate said steering wheel using said vibration actuator.

6. The lane departure prevention apparatus according to claim 1,
    wherein,
    said control unit is configured to vibrate said steering wheel using said electric motor.

7. The lane departure prevention apparatus according to claim 1,
    wherein,
    said control unit is configured to determine said steering assist force as force which includes:
        a feedforward amount, which is necessary for causing said vehicle to travel along said traveling lane and is determined based on a value corresponding to a curvature of said traveling lane; and
        a feedback amount, which is determined based on a distance in a lane width direction between a reference point on said vehicle and one of said lane markers.

* * * * *